United States Patent [19]
Kneier et al.

[11] 3,747,796
[45] July 24, 1973

[54] MOLDED CONTAINER

[75] Inventors: Joseph W. Kneier, Chesterland, Ohio; George D. Perkins, Laguna Beach, Calif.

[73] Assignee: Pendleton Tool Industries, Inc., Los Angeles, Calif.

[22] Filed: July 12, 1971

[21] Appl. No.: 161,699

[52] U.S. Cl. ............... 220/29, 190/48, 206/16 R, 220/31 S
[51] Int. Cl. ......................................... B65d 51/18
[58] Field of Search.............. 220/29, 31 R, 31 S; 206/12, 16 R, 16 E; 190/48, 52

[56] References Cited
UNITED STATES PATENTS
1,316,335  9/1919  Schoenborn ........................ 190/48
2,311,664  2/1943  Johnson ............................ 206/16 E FOREIGN PATENTS OR APPLICATIONS
27,221  1906  Great Britain ...................... 190/48

Primary Examiner—George E. Lowrance
Attorney—Frank S. Troidl and David W. Tibbott

[57] ABSTRACT

A container such as a fishing tackle box made of molded material and including a base and a pair of mating covers hinged to the base and forming the top half of the tackle box. The covers have mating edges including an upwardly opening gutter and a downwardly extending rib that seats in the gutter to aid in holding the covers closed and to prevent water form entering the box. The interlocking edges on the covers enables the tackle box to be lifted without the covers being latched and without them opening.

4 Claims, 6 Drawing Figures

INVENTORS
JOSEPH W. KNEIER
GEORGE D. PERKINS
BY
David W. Tilhou
ATTORNEY

PATENTED JUL 24 1973
3,747,796
SHEET 2 OF 3

INVENTORS
JOSEPH W. KNEIER
GEORGE D. PERKINS

BY
David W. Tillson
ATTORNEY

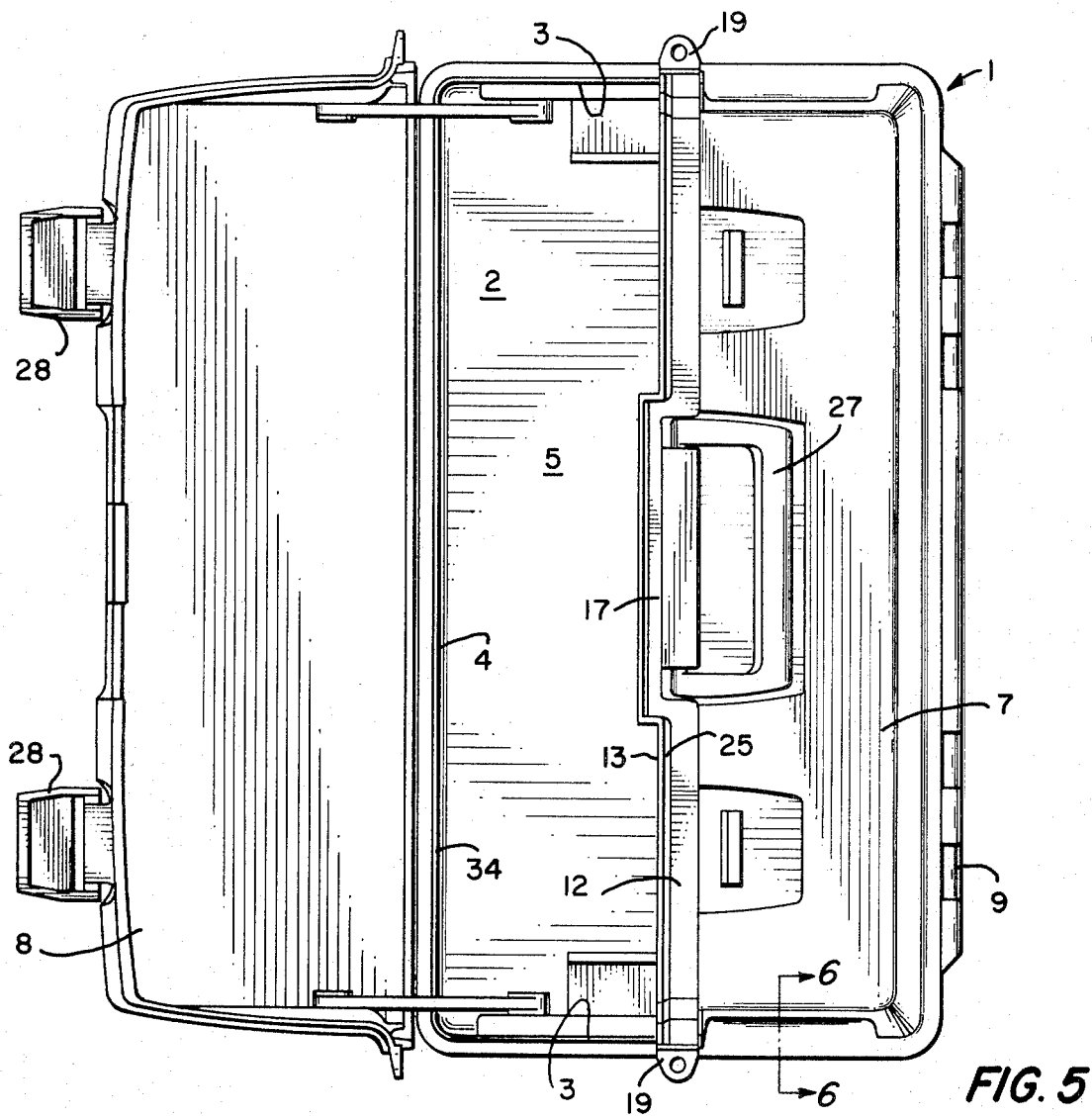
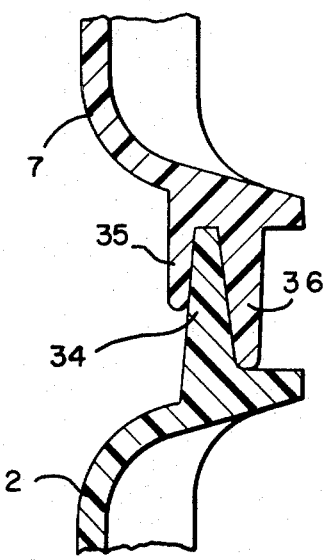

MOLDED CONTAINER

BACKGROUND OF INVENTION

This invention relates generally to the container art and more specifically to containers made of molded plastics and useful for a variety of purposes such as a fishing tackle box.

The prior art includes molded tackle boxes of the type having a pair of covers opening along a generally vertical plane and having a handle attached centrally along the upper edge of one of the covers. In general, this type of tackle box has required the use of reinforcing to avoid having a relatively flimsy or fragile feel or sensation to anyone carrying them. This is probably due to the flexible nature of the molded material when unreinforced. In addition, it is desirable in tackle boxes of this style or type to have means for avoiding water entering the box when the covers are closed.

SUMMARY OF INVENTION

The principal object of this invention is to provide a molded container of the foregoing type which is entirely composed of molded material without the use of metal reinforcing members, and which is substantially less flimsy than prior art containers of the same type.

Another important object of this invention is to provide a molded container of the foregoing type that sheds water when closed without water running into the container through the closing or parting line between the pair of covers.

A further object is to provide a container of the foregoing type which can be lifted while the covers are unlatched without the covers opening.

In general, the foregoing objects are attained in a container including a base and a pair of covers hinged to the base and closing along a vertical plane extending upwardly from the base. The mating edges of the covers are provided with an interlocking gutter and rib which aids in sealing the covers against the entry of dust and water and holds the covers closed even if the container is lifted while they are unlatched. A cover is provided with a tongue that fits into a slot provided in the other cover to further hold the covers together in case a downward force is applied to the handle of the container. The interlocking edges of the covers provide sufficient rigidity to the container to eliminate the need for the application of additional metal members to the container for reinforcing purposes.

BRIEF DESCRIPTION OF DRAWING

The invention is described in connection with the accompanying drawings wherein:

FIG. 5 is a top view of the container with one cover in open position; and

FIG. 6 is an enlarged fragmentary section taken on line 6—6 in FIG. 5.

DESCRIPTION OF PREFERRED EMBODIMENT

Figure 1:
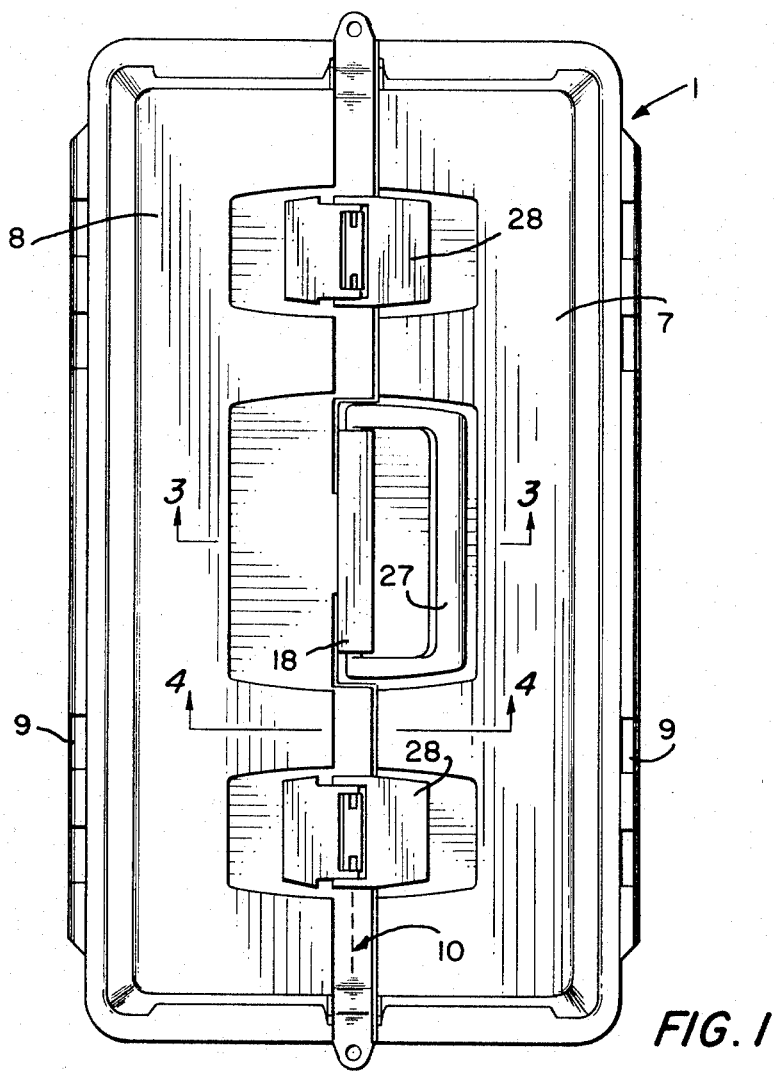
FIG. 1 is a top view of the container of this invention.

The tackle box 1 shown in the drawings includes an elongate base 2 comprising an upwardly opening tub or box having end walls 3, side walls 4 and a bottom 5. Looking down on the base 2, it has the appearance of a substantially rectangular tub.

Figure 2:
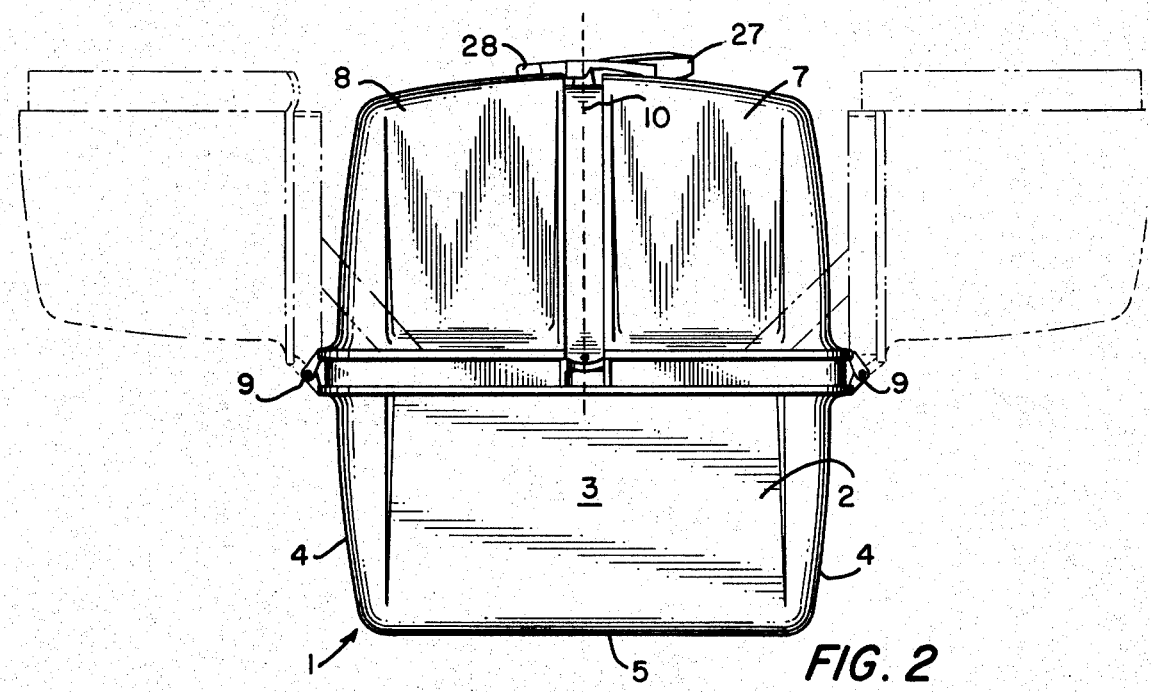
FIG. 2 is an end view of FIG. 1 showing the hinged covers in open position in dotted lines.

A pair of covers 7 and 8 are pivoted to hinges 9 attached to the upper edges of the opposite side walls 4 of the base 2 and arranged to close generally along a vertical plane or parting line 10 extending upwardly from the center of the base 2 and parallel with the side walls 4. The parting line 10 is shown in dotted lines in FIG. 2. The covers 7 and 8 have substantially the same shape and include a top wall, a side wall and two end walls with the top walls and end walls of the two covers being arranged to meet along the parting line 10 in the closed position. The novelty in this invention lies in the means provided to the closing or mating edges of the covers 7 and 8 where they close to reinforce or strengthen the tackle box 1 and to enable the box to shed water when closed.

Figure 3:
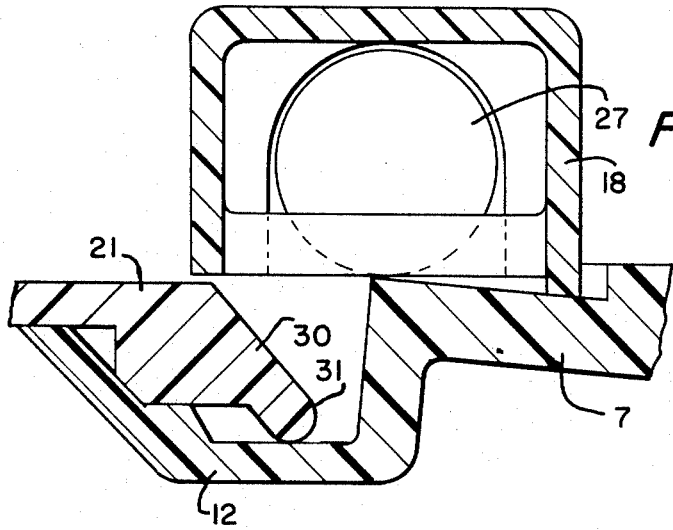
FIGS. 3 and 4 are enlarged fragmentary sections taken respectively along lines 3—3 and 4—4 in FIG. 1.

The cover 7 includes an upwardly opening gutter 12 including an outer leg 13, an inner leg 14 and a bottom 15 that extends the length of the top wall and along the edges of the end walls of the cover that are located on the parting line 10. As shown in FIG. 3, the gutter 12 is joined to the cover 7 by the gutter inner leg 14. The gutter 12 includes an offset portion 17 located midway of its length across the top wall of the cover 7 to allow the handle mounting block 18 to be located in longitudinal alignment with the major portion of the gutter 12. The reason for this will be explained later. It should be noted that the gutter 12 is continuous along its entire length and terminates at opposite end portions 19 located where the gutter 12 meets the top edge of the base 2. The end portions 19 of the gutter 12 are flared outwardly to insure that water flowing down the gutter 12 will be diverted outwardly of the base 2.

The cover 8 carries a strip 21 extending along its edges adjacent the parting line 10 arranged to overhang the gutter 12 when the covers are closed. The strip 21 carries a pair of ribs 22 and 23 projecting downward from its bottom face to engage the gutter 12 and aid in locating the covers 7 and 8 and stabilizing them when they are closed. The outer rib 22 is attached to the outer or free edge of the strip 21 and seats on the bottom 15 of the gutter 12. The inner rib 23 is spaced from the outer rib 22 and carries a beveled lowered edge 24 adapted to seat on an inclined inner surface 25 of the outer leg 13 of the gutter 12. The engagement of the beveled edge 24 with the inclined surface 25 serves to pull the two covers 7 and 8 closed and to hold them closed as the tackle box 1 is carried. This engagement also removes any looseness beneath the covers that might otherwise cause undesirable noise when the box is moved and further provides a person handling the box with the feeling or sensation that the tackle box is strong and sturdy.

Figure 4:
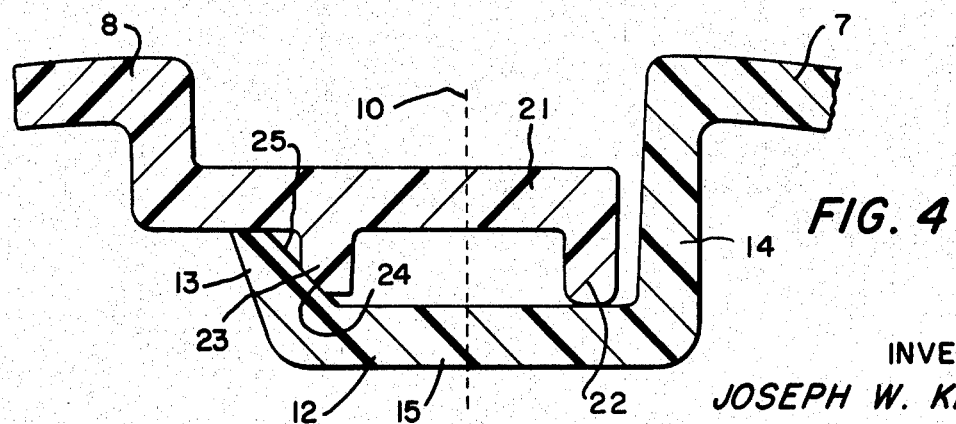

It should be recognized that in closing the covers 7 and 8 the cover 7 is moved to the closed position first and thereafter the cover 8 is moved to the closed position to seat the strip 21 in the gutter 12, as shown in FIG. 4.

A conventional handle 27 is pivoted to the handle mounting block 18. When the tackle box covers 7 and 8 are closed and the box is lifted by the handle 27, the upward force on the gutter 12 interlocks the covers closed regardless of whether they are latched by the conventional latches 28. This feature is very attractive to the many people who have accidently lifted a carrying case without its covers being latched and had the covers fly open to spill the contents. This self-locking feature of the covers 7 and 8 is further aided by locating the handle mounting block 18 in alignment with the gutter 12.

Means is also provided for preventing the covers from separating when a downward force is applied to the handle 27. This means includes a tongue 30 adapted to project horizontally beneath the handle mounting block 18 in the closed position of the covers 7 and 8. The tongue 30 actually projects from the gutter strip 21 and includes an inclined outer face 31 to allow the tongue 30 to enter the portion of the gutter 12 beneath the block 18 without interference with the block 18.

Means is also provided to seal the connection between the base 2 and the covers 7 and 8 against the entry of water into the box under normal conditions. A vertical flange 34 is fixed to and surrounds the top of the base 2 and the adjacent edges of the covers 7 and 8 have a pair of spaced downwardly extending lips 35 and 36 which seat over the flange 34. This structure is shown in FIG. 6.

While a single embodiment of the invention is shown and described, this invention is not limited merely to this single embodiment but contemplates other embodiments and variations which utilize the concepts and teachings of this invention.

We claim:

1. In a container made of molded materials and including a base and a pair of covers hinged to the base and closing along a vertical plane extending upwardly from the base, each of said covers including a top wall, a pair of end walls and an outer side wall and engaging each other in a closed position along the inner edges of said top and end walls with said inner edges located substantially along said vertical plane, the improvement comprising:

one of said covers having an outwardly opening gutter extending along the inner edges of its top and end walls and the other cover having a rib extendig at least along the inner edges of its top wall and adapted to project into and seat in said gutter when said covers are closed and forming a relatively waterproof joint.

2. The container of claim 1 including:

a handle attached to said one cover and located substantially in a vertical plane that extends through said gutter, said handle being operative to lift said gutter upwardly against said rib to prevent said covers from opening when lifting said container by said handle.

3. The container of claim 2 including:

a tongue attached to the other cover and seating under an overhanging portion provided on said one cover to prevent said one cover from bending downwardly away from said other cover if a downward force is applied to said one cover.

4. The container of claim 1 wherein:

said gutter and rib have interengaged surfaces that are inclined relative to said vertical plane and act to pull said covers together as they are closed.

* * * * *